Figure 1:
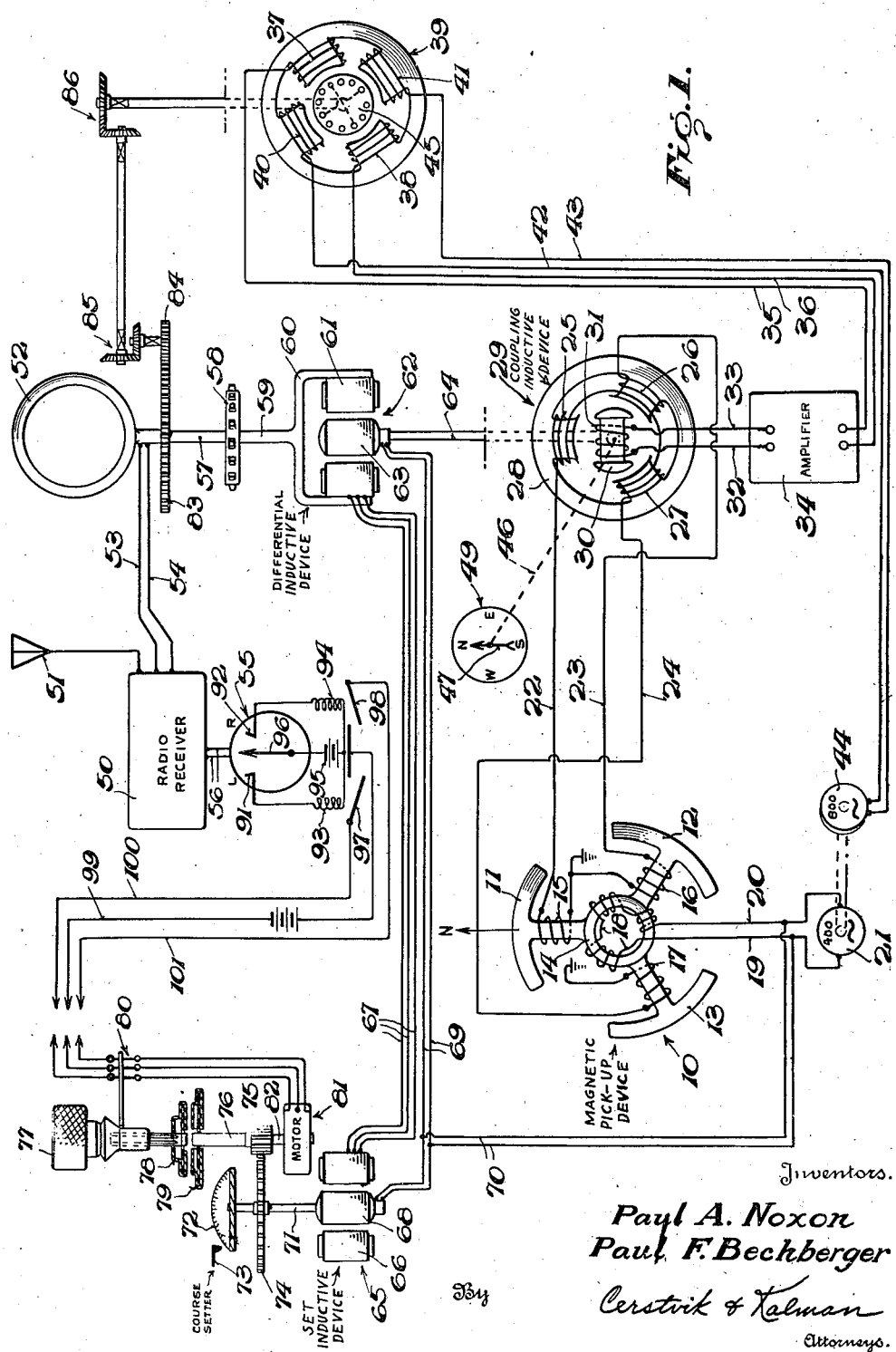

Sept. 4, 1945.　　　P. F. BECHBERGER ET AL　　　2,384,004
DRIFT CORRECTOR
Filed May 7, 1941　　　2 Sheets-Sheet 2

Inventors.
Paul A. Noxon
Paul F. Bechberger
By Cerstvik & Kalman
Attorneys.

Patented Sept. 4, 1945

2,384,004

UNITED STATES PATENT OFFICE 2,384,004

DRIFT CORRECTOR

Paul F. Bechberger and Paul A. Noxon, Tenafly, N. J., assignors to Bendix Aviation Corporation, Bendix, N. J., a corporation of Delaware Application May 7, 1941, Serial No. 392,384

14 Claims. (Cl. 250—11)

This invention relates to navigational control for mobile craft, such as air or water craft, and more particularly to navigational control of the type employing radio apparatus together with a magnetic compass whereby the craft is maintained upon a predetermined desired course without any departure therefrom due to extraneous forces acting upon the craft.

Structures heretofore known in the art, provided for maintaining mobile craft upon a desired course, have utilized a number of mechanical connections, among them being a mechanical differential arrangement between a radio compass and a magnetic compass, which necessarily contributed to the added weight and bulk of the apparatus. Furthermore, mechanical connections of the mentioned type require considerable attention to maintain the correlated parts in proper relation.

An object of the present invention, therefore, is to provide a novel navigational control apparatus for mobile craft, wherein the use of a mechanical differential has been done away with and the number of mechanical connections has been reduced to a minimum without any sacrifice as to the dependability and accuracy of the apparatus, thus overcoming the foregoing disadvantages.

Another object of the invention is to provide novel navigational control apparatus for mobile craft, whereby the latter is maintained upon a predetermined straight course independently of extraneous forces acting thereon.

A further object is to provide novel directional finding apparatus for use on water or air craft to maintain the latter at all times upon a predetermined straight course and adapted to overcome the occurrence of drift of the craft from the desired course.

An additional object of the invention is to provide novel directional finding apparatus of the above type utilizing an electrical system which is adapted to maintain a predetermined relation between the desired heading of the craft as defined by the transmitter at the point of destination and the earth's magnetic field.

Still another object is to provide direction finding apparatus of the above type which is adapted for either manual operation or adapted to be associated with an automatic pilot, whereby the apparatus functions automatically to at all times maintain the craft upon a desired predetermined course.

The above and other objects and advantages of the invention will appear more fully hereinafter from a consideration of the detailed description which follows, taken together with the accompanying drawings wherein one embodiment of the invention is illustrated. It is to be expressly understood, however, that the drawings are for the purpose of illustration and description only and are not designed as a definition of the limits of the invention, reference being had for this purpose to the appended claims.

Figure 2:
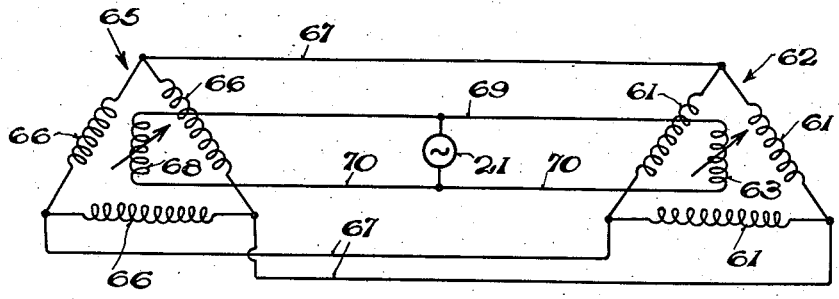
Figure 3:
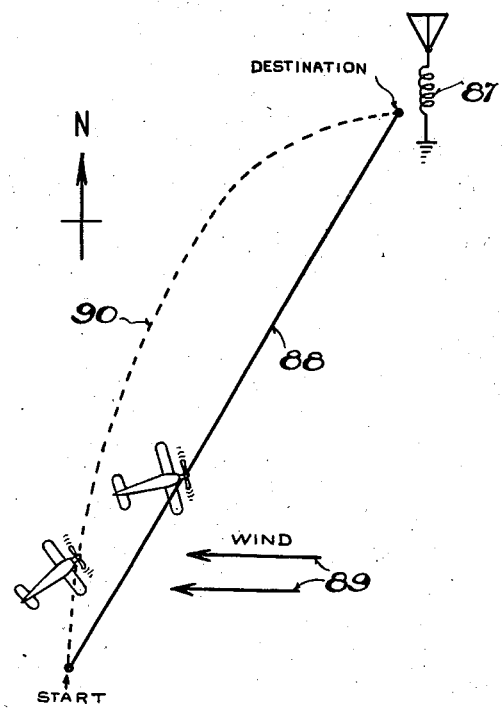

In the drawings, wherein like reference characters refer to like parts throughout the several views, Figure 1 is a schematic representation of the novel direction finding apparatus constituting the subject matter of the present invention;

Figure 2 is a wiring diagram of a portion of the apparatus illustrated in Figure 1; and Figure 3 illustrates certain characteristics involved in the operation of the apparatus illustrated in Figure 1.

As is well known to those skilled in the art, the use of a magnetic compass alone to establish a predetermined magnetic heading, or the use of the left-right indicator of a radio compass alone, is insufficient to maintain a craft upon a predetermined straight course due to the presence of extraneous forces such as cross winds, for example, which cause the craft to drift from the prescribed course, thus causing the craft to approach its destination along a curved path. In order to maintain the craft upon a straight predetermined course, it is necessary that the angle between the radio loop bearing and the magnetic north be kept constant at all times.

The present invention consists in providing navigational apparatus with novel means whereby the angle between the radio loop bearing and the magnetic north is maintained constant during craft flight to its destination, and comprises a magnetic compass and a radio loop which are interconnected electrically in such a manner that the radio loop orientation is maintained at a given angle with the magnetic north by virtue of the electrical interconnection.

In order to effect applicants' purpose, a novel magnetic compass is provided of the type shown and described in co-pending application of A. A. Stuart, Serial No. 336,444 filed May 21, 1940, and assigned to the same assignee as the present invention.

As shown more clearly in Figure 1 of the drawings, the compass comprises a magnetic pick-up device 10 mounted for movement with the craft, the pick-up device being formed of highly permeable material such as "Permalloy" or "Mumetal,"

and has three legs 11, 12 and 13, which are symmetrically disposed 120° apart and converge at their inner ends upon a central ring portion, or stationary armature 14, of the same material. The legs 11, 12 and 13 have windings 15, 16 and 17 respectively, wound thereon, while the armature 14 has an exciting winding 18 wound thereabout in three equal portions. The latter winding is connected through leads 19 and 20 to a suitable source of alternating current 21 which may have a frequency of 400 cycles. Windings 15, 16 and 17 have their inner ends grounded while their outer ends connect, by way of leads 22, 23 and 24, respectively, to coils 25, 26 and 27 respectively, which are wound about the poles of the stator 28, of a coupling inductive device 29. As is the case with inductive devices of this type, the rotor has a single-phase winding and the stator has a three-phase winding as shown diagrammatically in Fig. 2.

The coupling inductive device 29 is provided with an angularly movable rotor 30 carrying a coil 31 which is connected by way of leads 32 and 33 to the input of a conventional and well-known type vacuum tube amplifier 34 whose output, in turn, is connected by way of conductors 35 and 36 to coils 37 and 38 comprising one phase of a two-phase induction motor 39. The second phase of the induction motor 39, comprising coils 40 and 41, is electrically connected by way of leads 42 and 43 to the output of an alternator 44 whose frequency is double the frequency of the alternating current source 21 and which further is mechanically connected to the latter alternator so that any frequency variation in one alternator will be followed by a like variation in the other alternator. The one phase 37, 38 of the two-phase induction motor 39 is approximately 90° out of phase with the second phase 40, 41 of the motor 39 as is the case in motors of this type.

The two-phase induction motor 39 is also provided with a rotor 45 which is adapted to rotate upon change in the magnetic heading of the ship upon which the magnetic induction compass is mounted. Because of the change in magnetic heading the voltages induced in windings 15, 16 and 17 are changed and thus produce a change in voltages in stator coils 25, 26, 27 of the coupling device, whereby a current is induced in coil 31 of rotor 30, said current being amplified in the amplifier 34 and then caused to energize phase 37, 38 of the induction motor 39. Through an electrical connection, to be hereinafter more fully described, the rotor of the induction motor acts to drive rotor 30 of the coupling device 29 to a null position wherein no currents flow in coil 31, thus de-energizing the induction motor 39.

It will be observed that the new null position of the rotor 30 corresponds to the new magnetic heading of the craft, and, therefore, the rotor 30 may be mechanically connected by way of a shaft 46, for example, to pointer 47 of a compass repeater 49 or, if desired, the rotor 30 of the coupling device 29 may be used to displace the rotor of a transmitter of a self-synchronous system, whereby the rotor of the receiver of this latter system is urged to a corresponding position with the rotor of the transmitter. Thus the magnetic heading may be remotely indicated by the rotor of the receiver in the same manner as shown at the remote repeater 49.

The exciting winding 18 of the magnetic pick-up device has alternating current from source 21 passing therethrough in such a manner that the armature 14 is alternately saturated and unsaturated twice during each cycle of the exciting current from said source. With the legs 11, 12 and 13 of the magnetic pick-up device arranged in the manner illustrated in Figure 1, the amount of flux in each leg due to the earth's magnetic field is dependent upon the position of each leg with respect to the field. Upon momentary saturation of armature 14 due to current flow in winding 18, the reluctance of the armature is greatly increased thereby driving the earth's flux out of legs 11, 12 and 13, thus inducing alternating current voltages in windings 15, 16 and 17 respectively, said voltages having a frequency which is double the frequency of source 21 because the core 14 becomes saturated twice during each cycle of the exciting current. The induced voltages are communicated by way of conductors 22, 23 and 24 to stator coils 25, 26 and 27 of the coupling device 29, but since the resultant field of the latter windings is in a predetermined position, rotor 30 is in a null and thus no current is induced in coil 31. As soon, however, as the ship's magnetic heading is changed, the legs 11, 12 and 13 of the magnetic pick-up device assume a new position with respect to the earth's magnetic field, and due to the intermittent flowing of the earth's flux into the legs and out therefrom, because of the saturation and unsaturation of armature 14, new voltages are induced in windings 15, 16 and 17 which create a new resultant field about rotor 30 of the coupling device, thus inducing current flow in coil 31 and thereby energizing phase 37, 38 of the induction motor 39 to return rotor 30 to its null position corresponding with the craft's new magnetic heading through a novel electric differential system to be presently described. For a further and more complete description of the principles and operation of the magnetic pick-up device 10, reference is made to the aforementioned co-pending application Serial No. 336,444.

Referring again to Figure 1 of the drawings, the radio compass of the present invention will now be considered in greater detail. Mounted in a suitable manner upon the craft is a conventional radio receiver 50 of the radio direction finding type provided with a non-directive antenna 51 for receiving signals from the desired station to the frequency of which the radio receiver 50 has been tuned. Likewise mounted upon the craft in a suitable manner is the directive antenna or loop 52 which is connected to the radio receiver 50 by way of suitable leads 53 and 54 in such a manner that if the loop 52 is not oriented so as to be perpendicular to the radio oscillations emanating from the radio transmitter at the desired destination, currents are induced in the loop and communicated by way of leads 53, 54 to the radio receiver and the direction of loop displacement with respect to the radio transmitter at the destination is indicated upon a conventional and well-known left-right indicator 55 connected to the radio receiver output by way of suitable conductors 56.

The directive antenna or loop 52 is mounted upon a shaft 57 carrying a suitable wave front loop distortion compensator 58 which may be of the type shown and described in the co-pending application of P. A. Noxon, Serial No. 340,396 filed June 13, 1940, Patent No. 2,308,566, granted Jan. 19, 1943, and assigned to the same assignee as the present application, or the compensator may be of the type shown and described in the Patent No. 1,691,569 issued to V. F. Greaves November 13, 1928.

The compensated loop position is transferred to shaft 59 mounted in coaxial alignment with shaft 57 which carries a yoke member 60 having arranged thereon for angular movement therewith, the stator 61 of a differential inductive device designated generally at 62.

The differential device 62 is provided with a rotor 63 which is mechanically coupled by way of shaft 64 with the rotor 30 of the coupling device 29 for a purpose to presently appear.

Electrically connected with the differential device 62 is a set inductive device generally designated at 65 which is provided for transmitting the change in loop bearing to the differential device. This is accomplished by connecting the stationary stator 66 of set device 65 with the movable stator 61 of the differential device 62 by way of suitable leads 67. Likewise, rotor 68 of the set device 65 is electrically connected with rotor 63 of the differential device by means of suitable conductors 69, which in turn connect by way of leads 70 with the alternating current source 21, thereby defining a conventional self-synchronous system in which, when the receiver and transmitter stators are stationary, movement of the transmitter rotor produces an equal and corresponding angular movement of the receiver rotor. Reference is herewith made to Fig. 2 of the drawings for the electrical arrangement of receiver unit 62 and transmitting unit 65.

The rotor 68 of the set device 65 is connected through a shaft 71 to a course setting dial 72 which may cooperate with a suitable stationary index 73. The rotor shaft 71 is further provided with a gear 74 which meshes with a gear 75 mounted upon a shaft 76 adapted for manual rotation by way of a knob 77 through a suitable clutching device. The latter knob has two positions, one being an operative position whereby the knob is pushed downwardly until friction plate 78 is forced into engagement with a brake disc 79 and then rotated to rotate shaft 76 whereby this motion is transferred to gears 74, 75 to rotate shaft 71 together with rotor 68 of the set device. The brake arrangement 79 is provided to offset any reactive forces acting upon the rotor 68 of the set device.

In the second position of the knob 77, the latter is pulled outwardly disengaging plate 78 from the brake 79 and at the same time switch 80 is closed so as to connect the left-right indicator to the input side of a suitable reversible motor shown generally at 81 which upon energization assumes primary control of the angular movement of rotor 68 of the set device by way of its driving shaft 82 and gears 74 and 75. In this second position of the knob 77, the reversible motor 81 is actuated from the left-right indicator 55 in a direction related to the direction of displacement of the loop 52 with respect to the radio oscillations of the transmitter station.

The left-right indicator 55 is provided with a pair of oppositely disposed contacts 91 and 92, contact 91 being associated with a coil 93 while contact 92 is associated with a coil 94 both of which are connected to a common and suitable current source 95 and the pointer 96. An armature 97 is associated with coil 93 while coil 94 has an armature 98 associated therewith, coil 93 and armature 97 defining one relay and coil 94 and armature 98 defining a second relay. Depending upon the direction of displacement of the loop 52, pointer 96 will swing either to the left or right to engage either contact 91 or 92 thereby either energizing relay 93, 97 or relay 94, 98 to produce current flow to the input of reversible motor 81 in one direction by way of leads 99 and 100 or in an opposite direction by way of leads 99 and 101.

Shaft 57 which defines the desired orientation of loop 52 has a gear 83 mounted thereon which in turn meshes with a second gear 84 adapted to be rotated through a gearing system 85, 86 by the induction motor 39.

For a better understanding of the principles and coaction of the elements of the novel radio magnetic compass set forth hereinabove for the purpose of correcting for drift due to extraneous forces acting on the craft provided with the above apparatus, reference will now be had to the twofold operation thereof, i. e., manual and automatic.

*Manual operation*

When it is desired to manually control the novel radio magnetic compass of the present invention, knob 77 is urged downwardly causing plate 78 to engage brake 79, opening switch 80, thus disconnecting the reversible motor 81 from the radio output and giving shaft 76, together with gears 74 and 75, primary control of the rotation of rotor 68 of the set device.

Assume now, for the purposes of clarity, that the craft provided with the above apparatus, is on the ground at a point designated "Start" in Figure 3 of the drawings.

Radio receiver 50 is tuned in the well-known manner to the frequency of the transmitter station 87 at the point of destination, likewise shown in Figure 3. If the loop 52 is not in a position perpendicular to the direction of propagation of the radio oscillations of the radio transmitter 87, currents are induced to flow through leads 53, 54, to the radio receiver and the displacement of the loop with respect to the radio transmitter will be indicated on the left-right indicator 55.

Manual knob 77 is operated to angularly move rotor 68 of set device 65, thereby causing an unbalance in the voltage relationship of the stator 66 of the set device and communicating the unbalanced voltages by way of conductors 67 to the stator 61 of the differential device 62. The unbalanced voltage relation within stator 61 of the differential device causes the rotor 63 of the latter device to move angularly, and then rotor 63, by virtue of its mechanical connection by way of shaft 64 with rotor 30 of coupling device 29 moves the latter a corresponding angular amount and since the latter rotor has been displaced from its null position, currents are induced to flow within coil 31 which currents are communicated to the phase 37, 38 of the induction motor 39 by way of amplifier 34. The induction motor 39 being energized, drives loop 52, shaft 57, compensator cam 58 and shaft 59, together with yoke 60 and stator 61 of the differential device through gear trains 85, 86 and gears 83, 84. Angular movement of stator 61 of the differential device produces angular movement on the part of its rotor 63 which, in turn, mechanically urges rotor 30 of the coupling device to its null position at which point no currents flow within coil 31 thus causing de-energization of the induction motor 39.

If the left-right indicator 55 still indicates a position other than zero, notifying the pilot that the loop is at a position other than its null position, knob 77 is again operated to repeat the foregoing operation until such time as the left-right indicator assumes a zero position, thereby showing the pilot that loop 52 has been oriented to its null position, the position at which the loop is perpendicular to the direction of the propagation of the radio transmitter oscillations.

Once the left-right indicator 55 indicates zero, the pilot will observe the setting of dial 72 which has been rotated angularly with rotor 68 of the set device with respect to the stationary index 73 and find his prescribed course of flight to the destination, or, in other words, the setting of dial 72 with respect to index 73 corresponds to the angle between the lines of force of the earth's magnetic field and the loop bearing to maintain the craft upon a straight line 88, shown in Figure 3, between the point of origin and the destination. The pilot must keep constant the angle between the loop 52 and the magnetic north as indicated by the magnetic pick-up device 10, the amount of the angle being shown upon dial 72.

During flight and with the presence of cross winds such as that indicated at 89 in Figure 3, the craft may tend to deviate from the straight line 88 and attempt to fly to its destination along a curved path such as that indicated by the dotted line 90 of Figure 3. Assuming now that the cross winds 89 have forced the craft from the line of flight designated at 88, to a position where the craft's fore and aft axis is still parallel with the desired line of flight, loop 52 will no longer be properly oriented with respect to the radio oscillations of transmitter 87 and this will be indicated by a left-right indicator 55 whose pointer will swing either to left or right, depending upon the direction of the cross winds. The pilot will operate the craft controls in the proper direction so that the fore and aft axis of the craft will be changed to a position where the loop again assumes its null position. For each drift of the craft from a straight line of flight but where the fore and aft axis of the craft remains parallel to the desired line of flight, the foregoing procedure will be followed to alter the position of the fore and aft axis of the craft until loop 52 assumes its null position and left-right indicator 55 shows zero reading.

If, due to the presence of drift resulting from cross winds, the loop is on its null position but the craft's magnetic heading has changed, the voltages within pick-up device 10 are changed and as such, communicate to the stator of the coupling device thereby inducing currents in coil 31 of the rotor which flow through amplifier 34 to energize induction motor 39, which drives the loop from its null position, which will be indicated by the left-right indicator 55, and at the same time the stator 61 of the differential device is displaced angularly so that it drives its rotor 63 a corresponding amount which in turn returns rotor 30 of the coupling device to its null position thus de-energizing induction motor 39. The new null position of rotor 30 of the coupling device is communicated by way of shaft 46 to pointer 47 of the remote compass repeater 49 to indicate the new magnetic heading of the craft.

At this new magnetic heading, indicator 55 shows that loop 52 has been displaced from its null and the pilot again manually operates his craft controls to return the craft to a position where the left-right indicator will show zero to indicate that the loop has reached its null. From the foregoing, it is seen that the differential device 62 is effective in maintaining the loop 52 at a constant angle with respect to the lines of force of the earth's magnetic field to thereby maintain the craft upon the prescribed straight course 88 to its destination, thus overcoming the drifting effect injected due to the cross winds 89.

*Automatic operation*

If it be desired to maintain the loop bearing constant with respect to the earth's magnetic field in an automatic manner, knob 77 is operated to its second position whereby switch 80 is closed to connect the reversible motor 81 with the radio receiver output through the left-right indicator 55.

Radio receiver 50 is again tuned to the desired frequency of the transmitter 87 of Figure 3, for example, and if loop 52 is not properly oriented with respect to the direction of radio oscillations emanating from the transmitter, it will so be indicated by the left-right indicator 55. Depending upon the direction of displacement of the loop with respect to the transmitter, the pointer 96 of the indicator 55 will swing to either the left or right position to thereby engage either contact 91 or contact 92 to energize either relay 93, 97 or relay 94, 98 to thus actuate the reversible motor in either one direction or another. The reversible motor 81 angularly displaces rotor 68 of the set device and the electrical unbalancing created by such displacement is communicated to stator 61 of the differential device to move its rotor 63 a corresponding amount until the differential device and the set device are in electrical agreement, rotor 63 in turn angularly displacing rotor 30 of the coupling device whereby currents are induced to flow within coil 31 and amplifier 34 to energize induction motor 39 whereby the loop, together with stator 61 of the differential device is moved angularly until such time as movement on the part of rotor 63 of the differential device brings rotor 30 of coupling device 29 back to its null position to de-energize the induction motor. If this operation has not oriented the loop 52 in such a manner as to move pointer 96 of the left-right indicator 55 to its zero position, the preceding operation will again be repeated through the differential device until pointer 96 indicates zero.

The above condition is effected only when after a drift by the craft its fore and aft axis remains parallel with the craft's desired line of flight.

Assuming a condition of drift by the craft wherein the loop 52 stays on its null position but the magnetic heading of the craft has been changed, the voltages in coils 15, 16 and 17 of magnetic pick-up device 10 will be changed, as heretofore described, causing a shift in the magnetic field in the stator of the coupling device 29 which induces current flow within coil 31 and amplifier 34 to energize induction motor 39 which in turn angularly displaces loop 52 together with stator 61 of the differential device. If no other conditions were present, movement of loop 52 and stator 61 of the differential device would continue until rotor 63 of the differential device has moved rotor 30 of the coupling device 29 back to its null position thereby de-energizing the induction motor.

However, with the automatic arrangement, angular displacement of loop 52 causes needle 96 of the left-right indicator 55 to engage either contact 91 or 92 to energize the reversible motor 81 which in turn displaces rotor 68 of the set device, thus unbalancing the electrical relationship within the set device and communicating the unbalanced electrical relationship to the stator of the differential device which causes an additional angular movement on the part of rotor 63 of the latter device. Rotor 30 of the coupling device 29 is therefore driven past its null which creates an induction of currents within coil 31 in a reverse direction thereby causing the induction motor 39 to reverse its operation and rotate loop 52 back to its original position together with stator 61 of the differential device until such time as rotor 30 of the coupling device is returned to its null whereupon the induction motor 39 is de-energized. At this position the loop bearing has been maintained constant with respect to the earth's magnetic field and therefore the craft is held upon its prescribed course 88 as shown in Figure 3.

If desired, the automatic control apparatus above described may be used as shown and the pilot need merely to control his ship so that the left-right indicator 55 indicates zero. However, if so desired, the radio output may be connected to an automatic pilot to operate a rudder in the manner such, for example, as shown in Patent No. 1,958,259 to H. I. Becker issued May 8, 1934.

From the foregoing it will become readily apparent to those skilled in the art that there has been provided a new and novel radio magnetic compass which has the number of mechanical parts reduced to a minimum and which relies upon an electrical differential system which at all times accurately and reliably maintains constant the angle between the earth's magnetic field and the radio loop bearing with respect to the point of destination so that the craft is maintained upon a prescribed straight course unaffected by conditions of drift arising due to the presence of cross winds.

Although only one embodiment of the invention has been illustrated and described in detail, it is to be expressly understood that the invention is not limited thereto. Various changes may also be made in the design and arrangement of the parts without departing from the spirit and scope of the invention, as the same will now be understood by those skilled in the art. For a definition of the limits of the invention reference will be had primarily to the appended claims.

What is claimed is:

1. A drift indicator for mobile craft adapted for use in maintaining the craft on a predetermined straight course, comprising a directive antenna mounted on the craft and normally disposed in a predetermined direction with respect to radio waves emanating from a particular direction, a compass mounted on said craft, an inductive device having a movable portion connected with said compass for indicating the craft's magnetic heading, an electrical differential mechanism comprising angularly movable stator and rotor members for interconnecting said antenna and said movable portion, means for angularly driving said antenna whereby said movable portion follows the motion of said antenna, and means for energizing said driving means in response to a change in the craft's magnetic heading due to extraneous forces acting on said craft to angularly drive said antenna until said movable portion assumes a new predetermined position whereupon the driving means are de-energized to thus maintain said antenna in said predetermined direction with respect to said radio waves.

2. A drift indicator for mobile craft adapted for use in maintaining the craft on a predetermined straight course, comprising a directive antenna mounted on the craft and normally disposed in a predetermined direction with respect to radio waves emanating from a particular direction, means comprising a movable portion energized in response to a change in the craft's magnetic heading, electrical means interconnecting said antenna and the movable portion whereby angular movement of the antenna is communicated to said movable portion, an induction motor for driving said antenna, and means for energizing said induction motor in response to a change in the craft's magnetic heading due to extraneous forces acting on said craft to angularly drive said antenna until said movable portion assumes a null position whereupon the induction motor is de-energized to thus maintain said antenna in said predetermined direction with respect to said radio waves.

3. A drift indicator for mobile craft adapted for use in maintaining the craft on a predetermined straight course, comprising a directive antenna mounted on the craft and normally disposed in a predetermined direction with respect to radio waves emanating from a particular direction, means comprising a movable portion energized in response to a change in the craft's magnetic heading, electrical means comprising relatively rotatable stator and rotor means, the stator being connected with said antenna and the rotor being connected with said movable portion whereby angular movement of the antenna is communicated through said rotor to said movable portion, an induction motor for driving said antenna, and means for energizing said induction motor in response to a change in the craft's magnetic heading due to extraneous forces acting on said craft to angularly drive said antenna together with said stator whereby said movable portion is driven by said rotor to assume a null position whereupon the induction motor is de-energized to thus maintain the antenna in said predetermined direction with respect to said radio waves.

4. A drift indicator for mobile craft adapted for use in maintaining the craft along a predetermined straight course, comprising a radio antenna normally disposed in a predetermined direction with respect to radio waves emanating from a particular direction, means responsive to the direction of the earth's magnetic field, and an electrical differential mechanism comprising a device having angularly movable stator and rotor means, the stator being connected with said antenna and the rotor being connected with a portion of said responsive means whereby said antenna and the responsive means are interconnected through said differential mechanism to thereby maintain the antenna at a constant relation with respect to the earth's magnetic field notwithstanding the effect of extraneous forces acting on the craft to urge the latter from the predetermined straight course.

5. A drift indicator for mobile craft adapted for use in maintaining the craft on a predetermined straight course, comprising a directive antenna mounted on the craft and normally displaced in a predetermined direction with respect to radio waves emanating from a particular direction, means comprising a movable portion energized in response to a change in the craft's magnetic heading, electrical means comprising a pair of relatively rotatable means interconnecting said antenna and said movable portion, an induction motor for angularly driving said antenna and energized during energization of said movable portion, a reversible motor for energizing said electrical means, a radio receiver connected with said antenna, and means for indicating the position of said antenna with respect to said radio waves and interconnecting said radio receiver and said reversible motor whereby upon a deviation of said antenna from said predetermined position said reversible motor is operated to energize said electrical means to angularly move said movable portion to energize said induction motor whereby said antenna is driven angularly until said indicating means indicates the antenna to be in said predetermined position whereupon said reversible and induction motors are de-energized.

6. A drift indicator for mobile craft adapted for use in maintaining the craft on a predetermined straight course, comprising a directive antenna mounted on the craft and normally disposed in a predetermined direction with respect to radio waves emanating from a particular direction, means energized in response to a change in the craft's magnetic heading and having a movable portion, a self-synchronous system comprising a transmitter and receiver having electrically interconnected stators and rotors, the receiver stator being connected with said antenna and the receiver rotor being connected with and adapted for moving and energizing said portion of said movable first-named means, an induction motor for angularly driving said antenna and energized during energization of said portion, a reversible motor for angularly driving said transmitter rotor, and means responsive to the position of said antenna whereby upon a deviation of said antenna from said predetermined position said reversible motor is operated in accordance with such deviation to drive said transmitter rotor whereby the receiver rotor is moved angularly a corresponding amount to thus move and energize said portion whereby said induction motor is energized to drive said antenna to its predetermined position whereupon said reversible and induction motors are de-energized.

7. Drift indicating means for mobile craft adapted for use in maintaining the craft on a predetermined straight course, comprising a directive antenna mounted on the craft and normally disposed in a predetermined direction with respect to radio waves emanating from a particular direction, means comprising a coil energized in response to a change in the craft's magnetic heading, a self-synchronous system comprising a transmitter and receiver having electrically interconnected stators and rotors, the receiver stator being connected for angular movement with said antenna and the receiver rotor being mechanically coupled with and adapted for energizing said coil, an induction motor for angularly driving said antenna and energized during energization of said coil, a reversible motor for angularly driving said transmitter rotor, and means responsive to the position of said antenna whereby upon a deviation of said antenna from said predetermined position said reversible motor is operated to drive said transmitter rotor in accordance with such deviation whereby said receiver rotor is moved angularly a corresponding amount to thus energize said coil whereby said induction motor is energized to drive said antenna to its predetermined position together with said receiver stator whereupon the reversible and induction motors are de-energized.

8. In a radio magnetic compass for use in maintaining a mobile craft on a predetermined straight course, a directive antenna rotatably mounted on said craft normally arranged in a predetermined direction with respect to radio waves emanating from a particular direction, means responsive to the earth's magnetic field, electrical means interconnecting said antenna and a portion of said responsive means, an induction motor for angularly driving said antenna, and means responsive to the position of said antenna whereby upon a deviation of the antenna from said predetermined course due to extraneous forces acting on the craft, said portion of the responsive means is energized to cause said induction motor to drive said antenna to said predetermined direction.

9. In a radio magnetic compass for use in maintaining a mobile craft on a predetermined straight course, a directive antenna rotatably mounted on said craft normally arranged in a predetermined direction with respect to radio waves emanating from a particular direction, means responsive to the earth's magnetic field, means comprising a differential device having a relatively movable stator and rotor, the stator being connected for angular movement with said antenna relative to said rotor and the rotor being connected with a portion of said responsive means, an induction motor electrically connected with said responsive means for angularly driving said antenna, and means responsive to the position of said antenna, whereby upon a deviation of the antenna from said predetermined course due to extraneous forces acting on the craft said rotor is operated to energize said responsive means portion to cause said induction motor to drive said antenna to said predetermined direction.

10. A drift indicator for mobile craft adapted for use in maintaining the craft on a predetermined straight course, comprising a directive antenna mounted on the craft and normally disposed in a predetermined direction with respect to radio waves emanating from a particular direction, means comprising an angularly movable coil energized in response to a change in the craft's magnetic heading, a self-synchronous system comprising a transmitter and receiver having electrically interconnected stators and rotors, the receiver stator being connected for angular movement with said antenna and the receiver rotor being connected to move said coil to a null position to de-energize said coil, a reversible motor for driving said transmitter rotor, and an induction motor for angularly driving said antenna and energized during energization of said coil due to a change in the craft's magnetic heading resulting from extraneous forces acting on said craft to drive said antenna together with said receiver stator whereby said receiver rotor angularly moves said coil a corresponding angular amount toward a null position, said reversible motor being energized to drive said transmitter rotor upon angular movement of said antenna whereby said receiver rotor is moved angularly to again move said coil angularly a corresponding and additional amount so that said coil is driven past its null thus causing a reversal of said induction motor to drive said antenna in an opposite direction together with said receiver stator whereupon said receiver rotor drives said coil to its null, de-energizing said induction motor and thus maintaining said antenna in said predetermined position notwithstanding the change in the craft's magnetic heading.

11. A drift indicator for mobile craft adapted for use in maintaining the craft on a predetermined straight course, comprising a direction antenna mounted on the craft and normally disposed in a predetermined direction with respect to radio waves emanating from a particular direction, means comprising an angularly movable coil energized in response to a change in the craft's magnetic heading, electrical means having two relatively rotatable members interconnecting said antenna and said coil, means energized during energization of said coil due to a change in the craft's magnetic heading resulting from extraneous forces acting on said craft to drive said antenna together with one of said electrical members whereby the other of said members moves said coil a corresponding angular amount toward a null position, and means responsive to angular movement of said antenna for additionally energizing said other member to additionally move said coil a corresponding angular amount so that said coil is driven past its null thus causing a reversal of said driving means to drive said antenna in an opposite direction together with said one member whereupon said other member drives said coil to its null de-energizing said driving means and thus maintaining said antenna in said predetermined position notwithstanding the change in the craft's magnetic heading.

12. A homing device for mobile craft adapted for use in maintaining the craft on a predetermined straight course, comprising a directive antenna rotatably mounted on the craft and normally disposed in a predetermined direction with respect to radio waves emanating from a particular direction, means comprising a magnetic pickup device and a coupling inductive device connected therewith, said inductive device comprising a stator and an angularly movable rotor having a winding thereon which is energized in accordance with a change in the craft's magnetic heading electrically communicated from said pick-up device to said stator, electrical means having two relatively rotatable members interconnecting said antenna and said rotor, means energized during energization of said winding due to a change in the craft's magnetic heading to drive said antenna angularly together with one of said electrical members whereby the other of said members moves said rotor and winding a corresponding angular amount toward a null position, and means responsive to angular movement of said antenna for energizing said other member to move said rotor and winding a corresponding angular amount so that said rotor and winding are driven past their null position thus causing a reversal of said driving means to drive said antenna in an opposite direction together with said one member whereupon said other member drives said rotor and winding to their null position de-energizing said driving means and thus maintaining said antenna in said predetermined position.

13. A homing device for mobile craft adapted for use in maintaining the craft on a predetermined straight course, comprising a directive antenna rotatably mounted on the craft and normally disposed in a predetermined direction with respect to radio waves emanating from a particular direction, means comprising a magnetic pick-up device and a coupling inductive device connected therewith, said inductive device comprising a stator and an angularly movable rotor having a winding thereon which is energized in accordance with a change in the craft's magnetic heading electrically communicated from said pick-up device to said stator, and differential electrical means interconnecting said antenna and said rotor to maintain the antenna in said predetermined direction.

14. The combination on a moving object, of a directive antenna, a magnetic compass, an electrical differential mechanism comprising an inductive device having angularly movable stator and rotor members for interconnecting said compass and said antenna, means energized by said antenna and operable through said electrical mechanism for setting a predetermined angle between said compass and said antenna, and other means operable by said compass in response to a change in the magnetic heading of said object to maintain said compass and said antenna through said electrical mechanism at said predetermined angle.

PAUL F. BECHBERGER.
PAUL A. NOXON.